United States Patent
O'Dwyer et al.

(10) Patent No.: US 9,358,523 B2
(45) Date of Patent: Jun. 7, 2016

(54) SELF-IGNITION RESISTANT THERMALLY-ACTIVATED CARBON

(71) Applicant: Albemarle Corporation, Baton Rouge, LA (US)

(72) Inventors: Jonathan P. O'Dwyer, Brusly, LA (US); Qunhui Zhou, Baton Rouge, LA (US); Gregory H. Lambeth, Baton Rouge, LA (US); Yinzhi Zhang, Baton Rouge, LA (US); Christopher J. Nalepa, Zachary, LA (US)

(73) Assignee: Albemarle Corporation, Baton Rouge, LA (US)

( * ) Notice: Subject to any disclaimer, the term of this patent is extended or adjusted under 35 U.S.C. 154(b) by 0 days.

(21) Appl. No.: 14/515,092

(22) Filed: Oct. 15, 2014

(65) Prior Publication Data

US 2015/0031531 A1    Jan. 29, 2015

Related U.S. Application Data

(62) Division of application No. 13/259,432, filed as application No. PCT/US2010/029605 on Apr. 1, 2010, now Pat. No. 8,900,346.

(60) Provisional application No. 61/165,585, filed on Apr. 1, 2009.

(51) Int. Cl.
| | |
|---|---|
| *B01D 53/02* | (2006.01) |
| *B01J 20/30* | (2006.01) |
| *B01J 20/20* | (2006.01) |
| *C01B 31/08* | (2006.01) |
| *B01J 20/22* | (2006.01) |

(52) U.S. Cl.
CPC ............. *B01J 20/3078* (2013.01); *B01D 53/02* (2013.01); *B01J 20/20* (2013.01); *B01J 20/22* (2013.01); *C01B 31/083* (2013.01); *B01D 2253/102* (2013.01); *B01D 2257/206* (2013.01); *B01D 2257/302* (2013.01); *B01D 2257/404* (2013.01); *B01D 2257/60* (2013.01); *Y02C 20/10* (2013.01); *Y02P 20/154* (2015.11)

(58) Field of Classification Search
CPC .................. B01D 2253/102; B01D 2257/206; B01D 2257/302; B01D 2257/404; B01D 2257/60; B01D 53/02; B01J 20/20; B01J 20/22; B01J 20/3078; C01B 31/083; Y02C 20/10

See application file for complete search history.

(56) References Cited

U.S. PATENT DOCUMENTS

| | | | |
|---|---|---|---|
| 1,984,164 | A | 12/1934 | Stock |
| 3,557,020 | A | 1/1971 | Shindo et al. |
| 3,961,020 | A | 6/1976 | Seki |
| 4,394,354 | A | 7/1983 | Joyce |
| 4,427,630 | A | 1/1984 | Aibe et al. |
| 5,179,058 | A | 1/1993 | Knoblauch et al. |
| 6,514,907 | B2 | 2/2003 | Tsutsumi et al. |
| 6,843,831 | B2 | 1/2005 | van de Kleut et al. |
| 2004/0003716 | A1 | 1/2004 | Nelson, Jr. |
| 2005/0043172 | A1 | 2/2005 | Tsuji et al. |
| 2006/0051270 | A1 | 3/2006 | Brunette |
| 2007/0234920 | A1 | 10/2007 | Hainey |

FOREIGN PATENT DOCUMENTS

| | | |
|---|---|---|
| CN | 1986401 A | 6/2007 |
| CN | 1994555 A | 7/2007 |
| JP | 11128737 | 5/1999 |
| JP | 2004337310 A | 12/2004 |
| JP | 2005089291 A | 4/2005 |
| SU | 1351876 A1 | 11/1987 |
| WO | 2005/092476 A1 | 10/2005 |
| WO | 2006/039007 A2 | 4/2006 |
| WO | 2008/064360 A2 | 5/2008 |
| WO | 2010/036750 A1 | 4/2010 |
| WO | 2010/036752 A1 | 4/2010 |

OTHER PUBLICATIONS

"Activated Carbon"; Kirk-Othmer Encyclopedia of Chem Tech.; 1st Ed.; vol. 4; pp. 741-761; 2001; Online posting date; Dec. 4, 2000.

*Primary Examiner* — Christopher P Jones
(74) *Attorney, Agent, or Firm* — Marcy M. Hoefling

(57) ABSTRACT

Thermally-activated cellulosic-based carbon is rendered more thermally stable by exposure to a halogen and/or a halogen-containing compound. Such treated cellulosic-based carbon is suitable for use in mitigating the content of hazardous substances in flue gases, especially flue gases having a temperature within the range of from about 100° C. to about 420° C.

8 Claims, 5 Drawing Sheets

US 9,358,523 B2

SELF-IGNITION RESISTANT THERMALLY-ACTIVATED CARBON

REFERENCE TO RELATED APPLICATIONS

This application is a divisional of U.S. patent application Ser. No. 13/259,432, filed Dec. 8, 2011, now allowed, which is the National Stage of International Patent Appl. No. PCT/US2010/029605, filed on Apr. 1, 2010, which in turn claims the benefit of U.S. Provisional Patent Appl. No. 61/165,585, filed on Apr. 1, 2009, the disclosures of which are incorporated herein by reference.

FIELD OF THE INVENTION

This invention relates to self-ignition resistant, thermally-activated cellulosic-based carbon and to processes for its manufacture. Also, this invention relates to the use of such self-ignition resistant carbon to remove hazardous substances from flue gasses.

BACKGROUND OF THE INVENTION

It has become both desirable and necessary to reduce the hazardous substance content of industrial flue gasses. The hazardous substances can have a deleterious affect on the public health and the environment. Industry and government have been working to reduce the emissions of such substances with good progress being made. Special focus has been on flue gas from coal-fired boilers, such as that found in electric generation plants. But there is more to do. Hazardous substances include, particulates, e.g. fly ash, acid gases, e.g. SOx, $NO_x$, dioxins, furans, heavy metals and the like.

The methods used to mitigate the emission of hazardous substances depend on the nature of the hazardous substance, the minimum emission level sought, the volume of emitted gas to be treated per unit time and the cost of the mitigating method. Some hazardous substances lend themselves to removal from gaseous effluent by mechanical means, e.g. capture and removal with electrostatic precipitators (ESP), fabric filters (FF) or wet scrubbers. Other substances do not lend themselves to direct mechanical removal.

Hazardous gaseous substances that are present in a gaseous effluent present interesting challenges, given that direct mechanical removal of any specific gaseous component from a gas stream is problematic. However, it is known, and an industrial practice, to remove hazardous gaseous components from a gaseous effluent by dispersing a fine particulate adsorbent evenly in the effluent to contact and capture, in flight, the targeted gaseous component. This is followed by mechanical removal of the adsorbent with its adsorbate from the effluent vapor by ESP, FF or wet scrubbers. A highly efficacious adsorbent is carbon, e.g., cellulosic-based carbons, powdered activated carbon (PAC), etc. A PAC, for example, can be used with or without modification. Modified PACs may enhance capture of the target hazardous substance by enhancing adsorption efficiency. PAC modification is exemplified by U.S. Pat. No. 4,427,630; U.S. Pat. No. 5,179,058; U.S. Pat. No. 6,514,907; U.S. Pat. No. 6,953,494; U.S. 2001/0002387; U.S. 2006/0051270; and U.S. 2007/0234902. Cellulosic-based carbons include, without limitation, carbons derived from woody materials, coconut shell materials, or other vegetative materials.

A problem with the use of cellulosic-based carbons in industrial applications, is their unreliable thermal stability, that is, the lack of assurance that they are resistant to self-ignition. Self-ignition is especially problematic when the cellulosic-based carbon is used in the treatment of warm or hot gaseous effluents or when packaged or collected in bulk amounts. For example, bulk PAC is encountered (i) when the PAC is packaged, such as in super-sacks or (ii) when formed as a filter cake in an FF unit or is collected in silos or hoppers associated with an ESP, TOXECON unit, and baghouse. Self-ignition results from unmitigated oxidation of the carbon and can lead to its smoldering or burning. Self-ignition is exacerbated by the carbon being warm or hot, as could be the case when used in treating coal-fired boiler effluents. If oxygen (air) is not denied to the oxidation site or if the site is not cooled, the heat from the initial oxidation will propagate until the carbon smolders or ignites. Such an ignition can be catastrophic. Utility plants are especially sensitive about self-ignition as smoldering or fire within the effluent line can cause plant shut-down with widespread consequences to served customers.

Further information on PAC thermal stability can be found in U.S. Pat. No. 6,843,831, "Process for the Purification of Flue Gas." Some carbons are more resistant to self-ignition than others. In the US, the use of coal-derived PACs is the industry standard for utility flue gas treatment, in part because of the good thermal stability of coal-derived PACs.

It would be advantageous if cellulosic-based carbons (including cellulosic-based PACs) could be modified to be more thermally stable so that the practitioner could enjoy the benefit of the excellent adsorption qualities of cellulosic-based carbons.

BRIEF DESCRIPTION OF THE INVENTION

This invention relates to a thermally-activated cellulosic-based carbon that has been exposed to a halogen and/or a halogen-containing compound and that has at least one of the following: (i) a temperature of initial energy release that is greater than the temperature of initial energy release for the same thermally-activated cellulosic-based carbon without the halogen and/or halogen-containing compound exposure; (ii) a self-sustaining ignition temperature greater than the self-sustaining ignition temperature for the same thermally-activated cellulosic-based carbon without the halogen and/or halogen-containing compound exposure; and (iii) an early stage energy release value that is less than the early stage energy release value for the same thermally-activated cellulosic-based carbon without the halogen and/or halogen-containing compound exposure. It is believed that any one or more of the qualities recited in (i), (ii) and (iii) is indicative of an enhancement of the thermal stability of halogen and/or halogen-containing compound treated thermally-activated cellulosic-based carbon exposure as compared to the same thermally-activated cellulosic-based carbon without the halogen and/or halogen-containing compound exposure. From a commercial standpoint, obtaining parity or near-parity with energy release values for coal-derived carbons/PACs is highly predictive of good, acceptable, thermal stability. Reference to Table (I), infra, shows that the halogen and/or halogen-containing compound treated cellulosic-based carbons of this invention compare favorably with the reported non-cellulosic derived carbons/PACs. The halogen, for example, can be $Br_2$. This invention also relates to a process for enhancing the thermal stability of a thermally-activated cellulosic-based carbon. The process comprises exposing the thermally-activated cellulosic-based carbon to a halogen and/or halogen-containing compound at a temperature and for a time sufficient so that the exposed thermally-activated cellulosic-based carbon has at least one of the following: (i) a temperature of initial energy release that is greater than the temperature of initial energy release for the same thermally-activated cellulosic-based carbon without the halogen and/or halogen-containing compound exposure; (ii) a self-sustaining ignition temperature greater than the self-sustaining ignition temperature for the same thermally-activated cellulosic-based carbon without the halogen and/or halogen-containing compound exposure; and (iii) an early stage energy release value that is less than the early stage energy release value for the same thermally-activated cellulosic-based carbon without the halogen and/or halogen-containing compound exposure. This invention also relates to a halogen and/or halogen-containing compound exposed, thermally-activated cellulosic-based carbon that contains from about 2 to about 20 wt % halogen and has at least one of the following: (i) a temperature of initial energy release that is greater than the temperature of initial energy release for the same thermally-activated cellulosic-based carbon prior to the halogen and/or halogen-containing compound exposure; (ii) a self-sustaining ignition temperature greater than the self-sustaining ignition temperature for the same thermally-activated cellulosic-based carbon prior to the halogen and/or halogen-containing compound exposure; and (iii) an early stage energy release value that is less than the early stage energy release value for the same thermally-activated cellulosic-based carbon prior to the halogen and/or halogen-containing compound exposure. This invention also relates to a process for mitigating the atmospheric release of gaseous hazardous substances from flue gases containing such substances, the process comprising contacting the flue gas with a thermally-activated cellulosic-based carbon that has been exposed to a halogen and/or a halogen-containing compound and that has at least one of the following: (i) a temperature of initial energy release that is greater than the temperature of initial energy release for the same thermally-activated cellulosic-based carbon prior to the halogen and/or halogen-containing compound exposure; (ii) a self-sustaining ignition temperature greater than the self-sustaining ignition temperature for the same thermally-activated cellulosic-based carbon prior to the halogen and/or halogen-containing compound exposure; and (iii) an early stage energy release value that is less than the early stage energy release value for the same thermally-activated cellulosic-based carbon prior to the halogen and/or halogen-containing compound exposure.

DETAILED DESCRIPTION OF THE INVENTION

Figure 1:
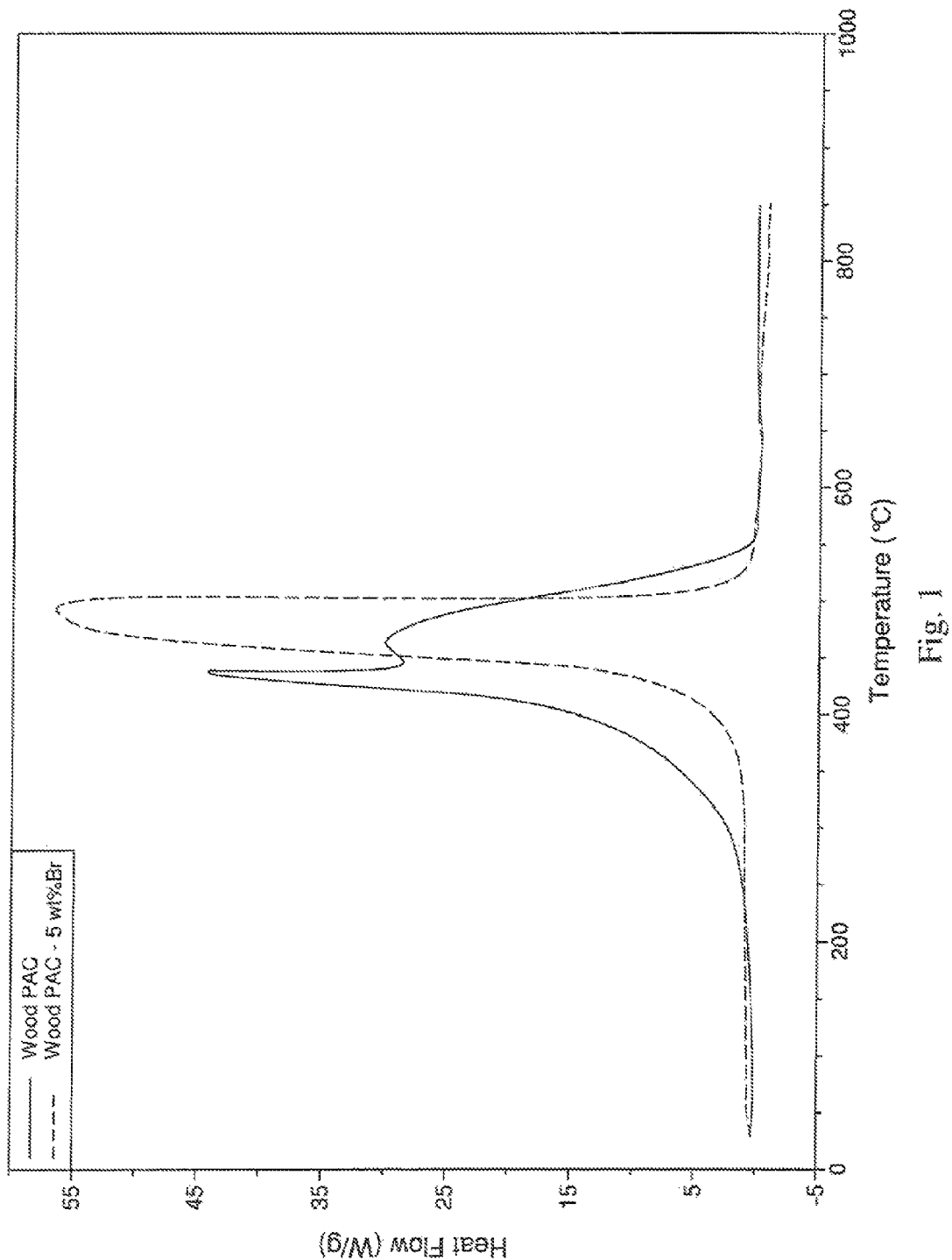
FIG. 1 is a comparative plot of Heat Flow v Temperature for untreated thermally-activated, wood-based carbon and for bromine vapor treated, thermally-activated, wood-based carbon.
Figure 2:
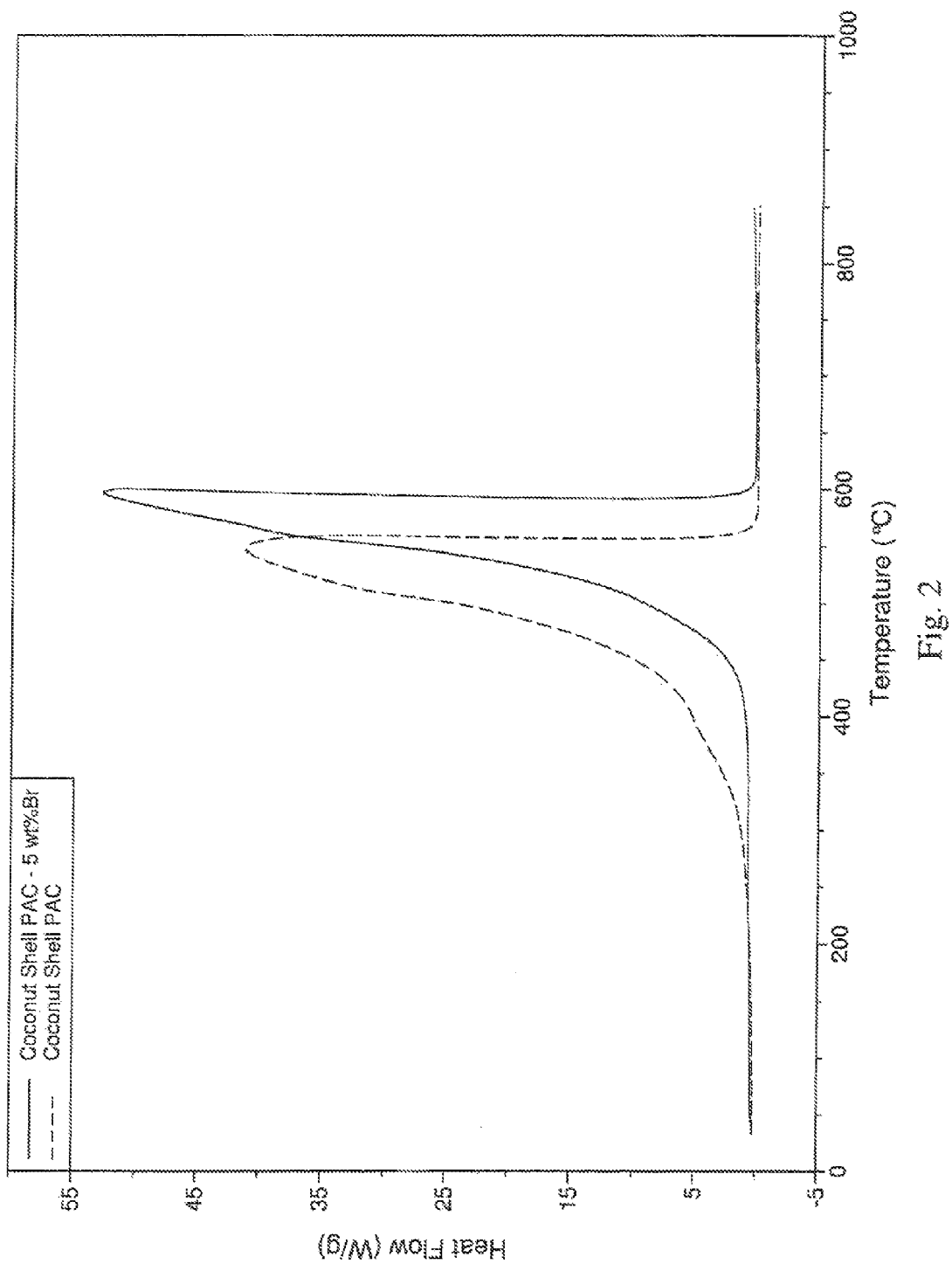
FIG. 2 is a comparative plot of Heat Flow v Temperature for untreated thermally-activated, coconut shell-derived PAC and for bromine vapor treated, thermally-activated, coconut derived PAC.
Figure 3:
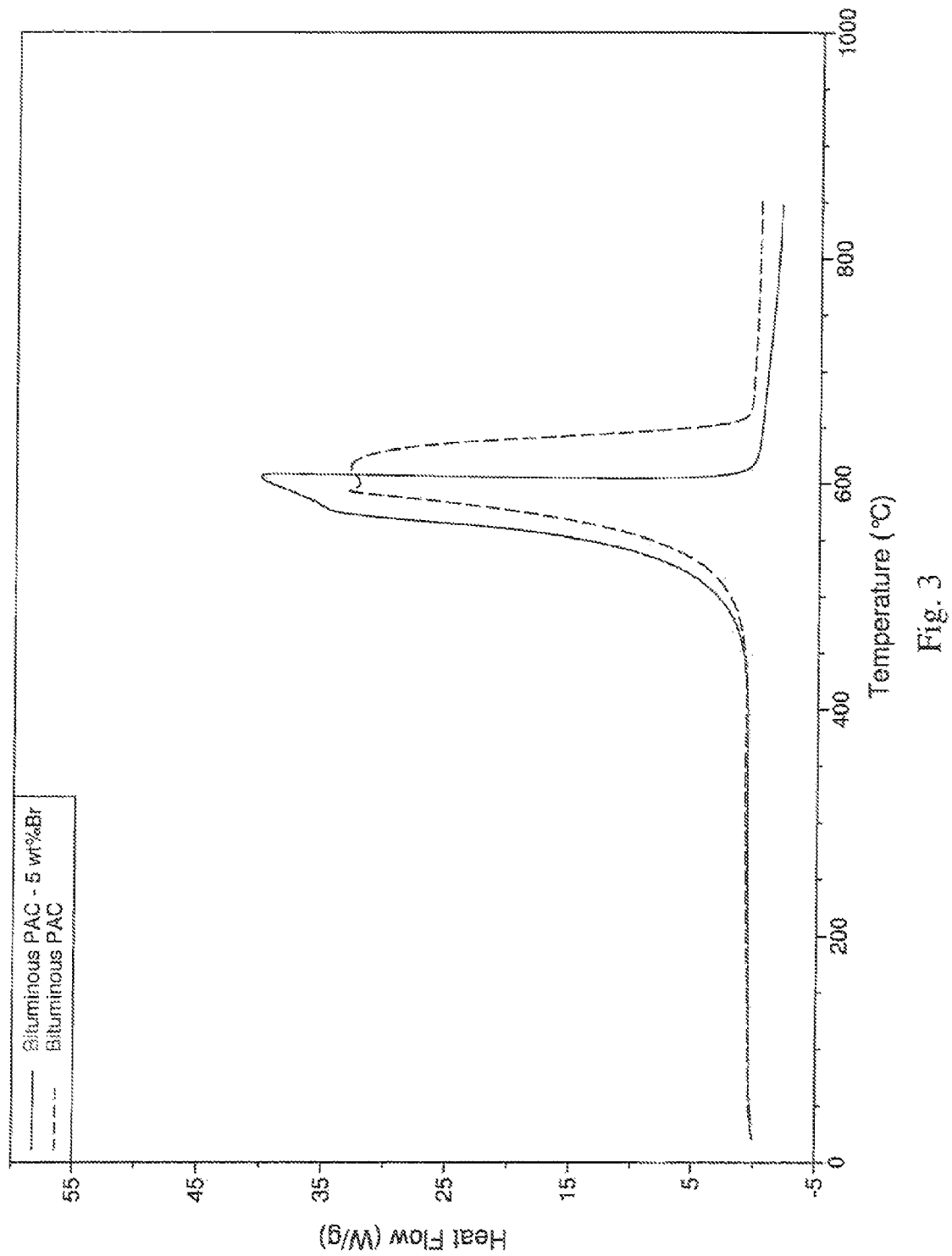
FIG. 3 is a comparative plot of Heat Flow v Temperature for untreated thermally-activated, bituminous coal-derived PAC and for bromine vapor treated, thermally-activated, bituminous coal-derived PAC.
Figure 4:
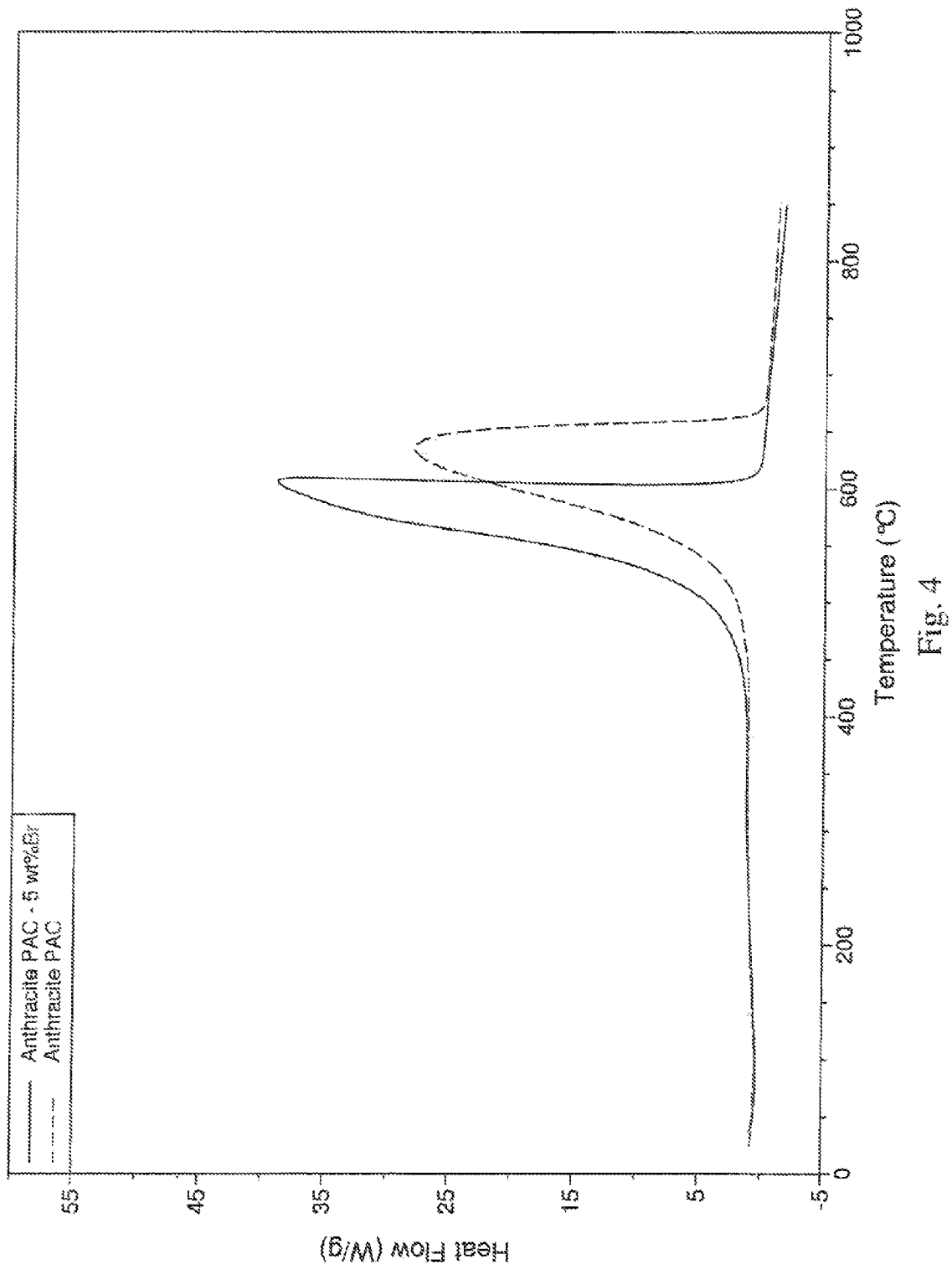
FIG. 4 is a comparative plot of Heat Flow v Temperature for untreated thermally-activated, anthracite coal-derived PAC and for bromine vapor treated, thermally-activated, anthracite coal-derived PAC.
Figure 5:
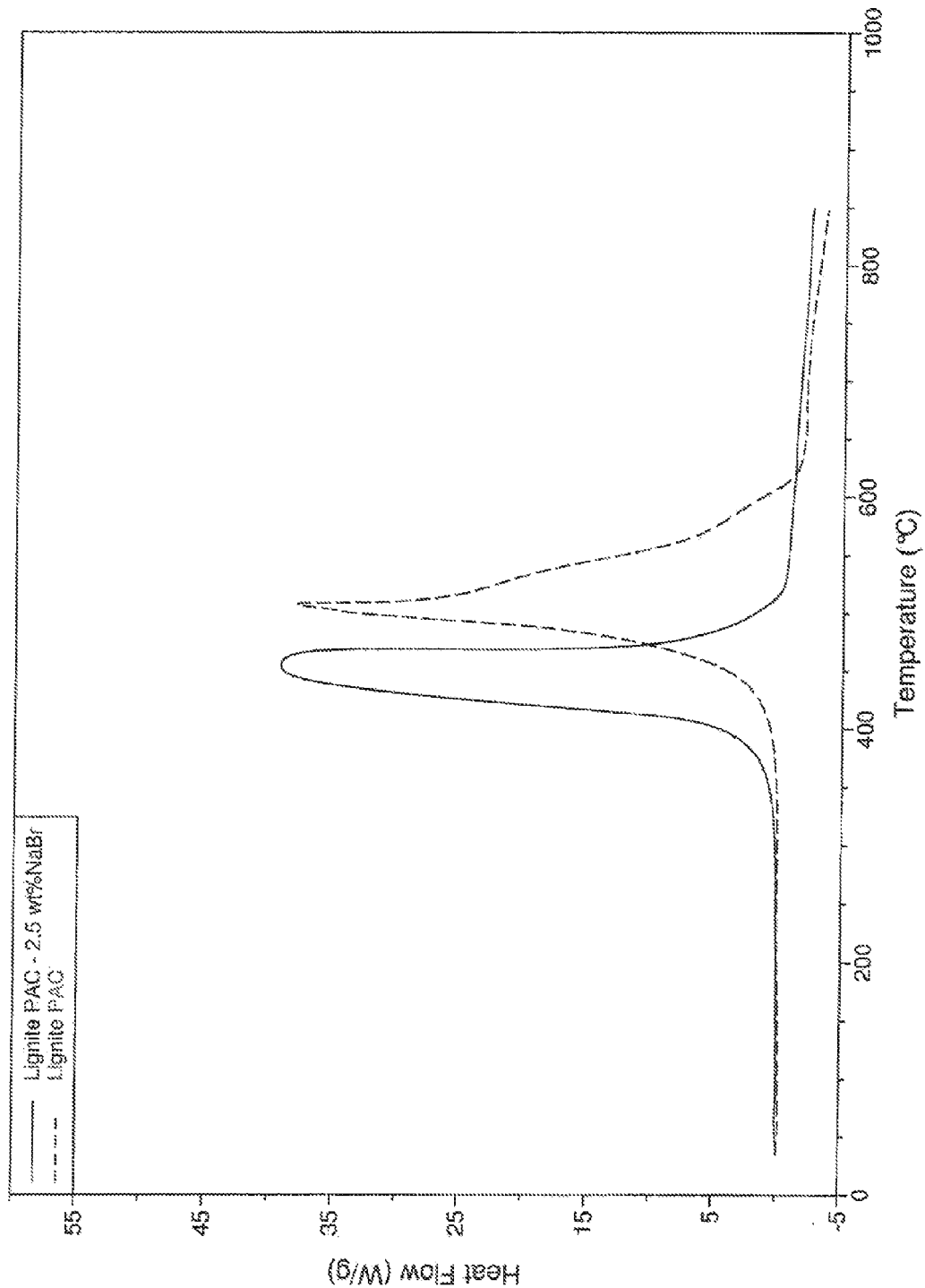
FIG. 5 is a comparative plot of Heat Flow v Temperature for untreated thermally-activated, lignite coal-derived PAC and for 2.5 wt % NaBr treated, thermally-activated, lignite coal-derived PAC.

The thermally-activated cellulosic-based carbons of this invention can be, as before noted, derived from cellulosic materials.

The production of thermally-activated cellulosic-based carbons, e.g., wood-based PACs, is well known and generally entails (i) devolatization or carbonization of the cellulosic material to produce a char, (ii) activation of the char and (iii) cooling/quenching of the activated char. For more detail see, *Kirk-Othmer Encyclopedia of Chemical Technology*, 1$^{st}$ Edition, Volume 4, pages 741-761 2001. The thermally-activated wood-based carbon can be produced from any wood source, such as sawdust, woodchips, or other particulate wood products.

Thermally-activated cellulosic-based carbons are commercially available. For example, thermally-activated wood-based carbons can be obtained from MeadWestvaco Corporation, Specialty Chemical Division. Thermally-activated cellulosic-based carbons can be characterized by their particle size distribution ($D^{10}$, $D^{50}$ and $D^{90}$); average particle size; BET surface area; Iodine No.; total pore volume; pore volume distribution (macro/meso and micro pores); elemental analysis; moisture content; and ash speciation and content. Particularly useful thermally-activated cellulosic-based carbons have one or more of the following characteristics:

| Characteristic | General Range | Specific Range |
| --- | --- | --- |
| $D^{10}$ | 1-10 μm | 2-5 μm |
| $D^{50}$ | 5-35 μm | 10-20 μm |
| $D^{90}$ | 20-100 μm | 30-60 μm |
| Average Particle Size: | 10-50 μm | 15-25 μm |
| BET: | >300 m$^2$/g | >500 m$^2$/g |
| Iodine No.: | 300-1200 mg/g | >600 mg/g |
| Total Pore Volume: | 0.10-1.20 cc/g | 0.15-0.8 cc/g |
| Macro/Meso Pore Volume: | 0.05-0.70 cc/g | 0.05-0.40 cc/g |
| Micro Pore Volume: | 0.05-0.50 cc/g | 0.10-0.40 cc/g |
| Ash Content: | 0-15 wt % | <10 wt % |
| Moisture Content: | 0-15 wt % | <5 wt % |

The halogen and/or a halogen-containing compound used in treating cellulosic-derived carbons in accordance with this invention can comprise bromine, chlorine, fluorine, iodine, ammonium bromide, other nitrogen-containing halogen salts, calcium bromide, other inorganic halides, etc.

The halogen and/or halogen-containing compound treatment of the cellulosic-based carbons can be effected by batch or continuous methods. A suitable batch process feeds the cellulosic-based carbon to a tumble reactor/dryer. Upon completion of the feed, the fed cellulosic-based carbon can be dried as needed if its moisture content exceeds 5 wt % based on the total weight of the fed cellulosic-based carbon. An initial temperature of from about 75° C. to about 82° C. is obtained. In one application, gaseous Br$_2$, at its boiling point temperature, is fed to the reactor/dryer. The reactor/dryer pressure is conveniently kept at around ambient pressure. The dryer is run in the tumble mode during and after the feed. The post-feed tumble period is from about 30 minutes to an hour. Quantitatively, the amount of Br$_2$ fed corresponds identically or nearly identically with the desired bromine content of treated cellulosic-based carbon. For example, if a treated cellulosic-based carbon having a bromine content of about 5 wt % (based on the total weight of the treated cellulosic-based carbon) is desired, then the amount of Br$_2$ fed is 5 parts Br$_2$ per 95 parts cellulosic-based carbon. The Br$_2$ feed rate is essentially uniform throughout the Br$_2$ feed period. After the post feed tumble period, the treated cellulosic-based is removed from the reactor/dryer to storage or packaging.

A suitable continuous process for treating cellulosic-based carbon features a separate co-feed of gaseous $Br_2$ and cellulosic-based carbon to a mixing T. The particulate cellulosic-based carbon is transported to and through the mixing T by air. The temperature of the cellulosic-based carbon is from about 80° C. to about 105° C. The gaseous $Br_2$ is fed at its boiling point to the other leg of the T. Ambient pressure may be used. The mixing T provides a residence time of about 0.5 to about 2.0 seconds. To enhance mixing, a downstream eductor can be used to insure turbulent mixing. Quantitatively, the same proportions used in the batch method are used in the continuous method.

In both the described batch and continuous methods, all of the $Br_2$ fed is incorporated in the cellulosic-based carbon. Thus, it is convenient to refer to the amount of $Br_2$ in the treated cellulosic-based carbon by reference to the amounts of $Br_2$ and cellulosic-based carbon fed to the reactor. A 5 kg feed of $Br_2$ and a 95 kg feed of cellulosic-based carbon will be deemed to have produced a gaseous bromine treated cellulosic-based carbon containing 5 wt % bromine. However, if a practitioner should desire to directly measure the incorporated bromine, such measure can be affected by Schoniger Combustion followed by silver nitrate titration.

Gaseous halogen contacted cellulosic-based carbon can contain from about 2 to about 20 wt % bromine, the wt % being based on the total weight of the contacted cellulosic-based carbon. A wt % bromine within the range of from about 5 to about 15 wt % will be useful when treating flue gas from coal-fired boilers.

For determination of (i) a temperature of initial energy release; (ii) a self-sustaining ignition temperature; and (iii) the early stage energy release values, it is useful to have a Differential Scanning Calorimetry (DSC) trace of the heat flow values vs temperature (° C.) of the treated and untreated thermally activate cellulosic-based carbon samples as they are controllably heated. The DSC conditions can be as follows: the sample size is about 10 mg; the carrier gas is air at a flow rate of 100 ml/minute; the temperature ramp rate is 10 centigrade degrees/minute from ambient temperature to 850° C. The DSC can be run on a TA Instruments Thermal Analyst 5000 Controller with Model 2960 DSC/TGA module. The DSC traces created from the DSC test results can be analyzed with TA instruments Universal Analysis Software, version 4.3.0.6. The sample can be dried thoroughly before being submitted to DSC testing. Thermal drying is acceptable, e.g., drying a 0.5 to 5.0 gram sample at a drying temperature of 110° C. for 1 hour.

The values obtained from the DSC testing can be traced on a Heat Flow (watts/gram) versus Temperature (° C.) graph. FIGS. 1-5 are exemplary of the DSC traces that can be obtained.

The temperature of initial energy release, aka the point of initial oxidation (PIO), is the temperature at which the surface properties have started to change due to the oxidation reactions reaching an arbitrary level of significance. It is proposed to define the PIO as the temperature at which the value of the Heat Flow exceeds 0.2 W/g as a function of the temperature curve, Heat Flow values were adjusted to give a baseline value of zero at a temperature of 125° C.

The self-sustaining ignition temperature is usually defined as the intersection of the baseline and the slope at the inflection point of the Heat Flow as a function of Temperature curve. The inflection point is found by the before mentioned software. Generally, the inflection point is defined in differential calculus as a point on a curve at which the curvature changes sign. The curve changes from being concave upwards (positive curvature) to concave downwards (negative curvature), or vice versa. For example, in FIG. 1, the self-sustaining ignition temperature for untreated TAWPAC (thermally activated wood-based powdered activated carbon) is about 400° C. and for gaseous bromine treated TAWPAC is about 434° C.

The early stage energy release values are determined by integration of the DSC trace between 125° C. to 425° C. and between 125° C. to 375° C. The values from these two integrations are each compared against the same values obtained for PACs that are known to have suitable thermal stability, i.e. "benchmark carbons." Benchmark carbons are exemplified by lignite coal derived PAC impregnated with NaBr of the type marketed by Norit Americas, Inc. which coated PAC has been found (see FIG. 5) to have an early stage energy release values (125° C. to 425° C.) of 1,378 joule/gram and 370 joule/gram for 125° C. to 375° C. In FIG. 1, the cellulosic-derived untreated TAWPAC has values of 5,873 joules/gram (125° C. to 425° C.) and 2,709 joules/gram (125° C. to 375° C.). The gaseous bromine treated TAWPAC is shown in FIG. 1 to have values of 1,247 (125° C. to 425° C.) and 345 joules/gram (125° C. to 375° C.). As can be seen the gaseous bromine treated TAWPAC has early stage energy release values comparable to the Norit benchmark carbon product. Untreated TAWPAC has early stage energy release values that are far removed from the Norit benchmark carbon product.

The following Table (I) reports on the temperature of initial energy release (PIO), the self-sustaining ignition temperature (SIT); and the early stage energy release values for various PACs based on DSC analysis.

TABLE (I)

| Sample Description | PIO ° C. | SIT ° C. | Energy (125->425) J/g | Energy (125->375) J/g |
|---|---|---|---|---|
| TAWPAC | 174.2 | 400 | 5873 | 2709 |
| TAWPAC - 5 wt % Br | 244.9 | 434 | 1247 | 345 |
| Coconut Shell PAC | 196.3 | 464 | 2710 | 1255 |
| Coconut Shell PAC - 5 wt % Br | 275.3 | 516 | 389 | 232 |
| Calgon Bituminous PAC | 232.3 | 557 | 387 | 304 |
| Calgon Bituminous PAC - 5 wt % Br | 260.4 | 542 | 311 | 231 |
| Anthracite PAC | 183.7 | 545 | 698 | 538 |
| Anthracite PAC - 5 wt % Br | 169.2 | 525 | 997 | 746 |
| Norit Lignite PAC | 323.6 | 473 | 493 | 227 |
| Norit Lignite PAC - 2.5 wt % NaBr | 295.3 | 403 | 1378 | 370 |

That which is claimed is:

1. A thermally-activated cellulosic-based carbon that has been exposed to a halogen and/or a halogen-containing compound, has an ash content of 10 to 15 wt % and that has at least one of the following:
   (i) a temperature of initial energy release that is greater than the temperature of initial energy release for the same thermally-activated cellulosic-based carbon without the halogen and/or halogen-containing compound exposure;
   (ii) a self-sustaining ignition temperature greater than the self-sustaining ignition temperature for the same thermally-activated cellulosic-based carbon without the halogen and/or halogen-containing compound exposure; and
   (iii) an early stage energy release value that is less than the early stage energy release value for the same thermally-activated cellulosic-based carbon without the halogen and/or halogen-containing compound exposure.

2. The thermally-activated cellulosic-based carbon of claim 1 wherein the halogen and/or halogen-containing compound comprises bromine, chlorine, fluorine, iodine, ammonium bromide, other nitrogen-containing halogen salts, or calcium bromide.

3. The thermally-activated cellulosic-based carbon of claim 1 wherein the thermally-activated cellulosic-based carbon that has been exposed to a halogen or halogen-containing compound contains from about 2 to about 20 wt % halogen, the wt % being based on the total weight of the thermally-activated cellulosic-based carbon that had been exposed to the halogen and/or the halogen-containing compound.

4. A process for enhancing the thermal stability of a thermally-activated cellulosic-based carbon, which process comprises exposing the thermally-activated cellulosic-based carbon to a halogen and/or a halogen-containing compound at a temperature and for a time sufficient so that thermally-activated cellulosic-based carbon that has been exposed to the halogen and/or the halogen-containing compound, has an ash content of 10 to 15 wt % and has at least one of the following:
 (i) a temperature of initial energy release greater than the temperature of initial energy release for the same thermally-activated cellulosic-based carbon prior to the halogen and/or halogen-containing compound exposure;
 (ii) a self-sustaining ignition temperature greater than the self-sustaining ignition temperature for the same thermally-activated cellulosic-based carbon prior to the halogen and/or halogen-containing compound exposure; and
 (iii) an early stage energy release value that is less than the early stage energy release value for the same thermally-activated cellulosic-based carbon prior to the halogen and/or halogen-containing compound exposure.

5. The process of claim 4 wherein the halogen and/or halogen-containing compound comprises bromine, chlorine, fluorine, iodine, ammonium bromide, other nitrogen-containing halogen salts, or calcium bromide.

6. The process of claim 4 wherein the thermally-activated cellulosic-based carbon is exposed to the halogen and/or the halogen-containing compound at a temperature from 82 to 105° C. and for a period of time within the range of from 0.1 to 3 seconds.

7. A halogen and/or halogen-containing compound exposed, thermally-activated cellulosic based carbon that contains from about 2 to about 20 wt % halogen, has an ash content of 10 to 15 wt %, is prepared absent contact with acid, water or a combination thereof and has at least one of the following:
 (i) a temperature of initial energy release that is greater than the temperature of initial energy release for the same thermally-activated cellulosic based carbon prior to the halogen and/or halogen-containing compound exposure,
 (ii) a self-sustaining ignition temperature greater than the self-sustaining ignition temperature for the same thermally-activated cellulosic-based carbon prior to the halogen and/or halogen-containing compound exposure; and
 (iii) an early stage energy release value that is less than the early stage energy release value for the same thermally-activated cellulosic-based carbon prior to the halogen and/or halogen-containing compound exposure.

8. The thermally-activated cellulosic-based carbon of claim 7 wherein the halogen and/or halogen-containing compound comprises bromine, chlorine, fluorine, iodine, ammonium bromide, other nitrogen-containing halogen salts, or calcium bromide.

* * * * *